United States Patent [19]

Funkhouser

[11] Patent Number: 4,573,385

[45] Date of Patent: Mar. 4, 1986

[54] CHAIN SAW CUTTING TABLE

[76] Inventor: Berland M. Funkhouser, P.O. Box 2395, Winchester, Va. 22601

[21] Appl. No.: 519,671

[22] Filed: Aug. 2, 1983

[51] Int. Cl.⁴ .......................................... B27B 27/02
[52] U.S. Cl. ...................... 83/788; 83/574; 83/859
[58] Field of Search .................. 83/574, 796–798, 83/701, 859; 269/289 R

[56] References Cited

U.S. PATENT DOCUMENTS

| | | | |
|---|---|---|---|
| 2,851,067 | 9/1958 | Greenslate | 83/796 |
| 3,942,781 | 3/1976 | Gerber | 269/289 R |
| 4,215,612 | 8/1980 | Peel | 83/574 |
| 4,283,980 | 8/1981 | Jackson | 83/574 |
| 4,320,679 | 3/1982 | Trudeau | 83/574 |
| 4,350,067 | 9/1982 | Picard | 83/574 |
| 4,351,209 | 9/1982 | Alford | 83/574 |

*Primary Examiner*—James M. Meister
*Assistant Examiner*—John L. Knoble
*Attorney, Agent, or Firm*—William F. Frank

[57] ABSTRACT

A chain saw cutting table comprising a chain saw support table assembly, removable front and rear leg assemblies for the support table assembly, an adjustable chain saw bar support assembly operatively positioned on the support table assembly and a trigger/switch assembly to activate a chain saw secured to the support table assembly and having a connection to the front leg assembly.

5 Claims, 11 Drawing Figures

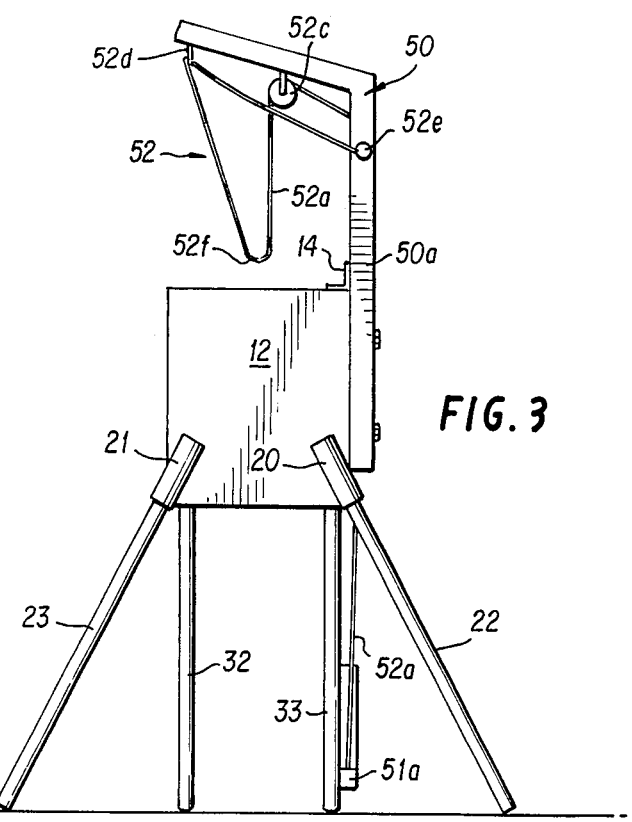
FIG. 3
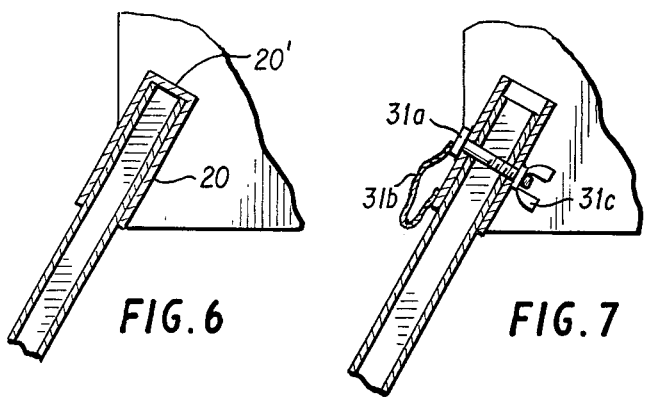
FIG. 6
FIG. 7
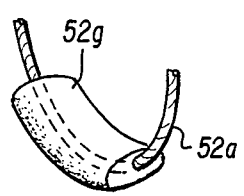
FIG. 11
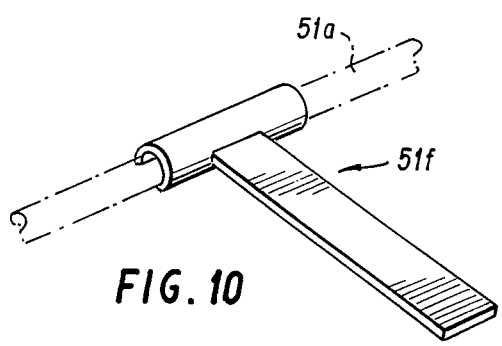
FIG. 10

4,573,385

CHAIN SAW CUTTING TABLE

FIELD OF THE INVENTION

The present invention is in the field of chain saws and more particularly the field of accessories to enhance the utility of the saw.

BACKGROUND OF THE INVENTION

The chain saw has great utility in cutting of firewood, particularly the larger pieces. However, the cutting of limbs for kindling or small stoves is time-consuming when such is done by holding the saw in the user's hands. To speed up such cutting, tables have been devised which pivot the saw about the motor end or the bar end, and the saw is caused to move about its pivot by a foot treadle which may also operate the trigger or switch. The wood to be cut is placed on the table and the saw is moved up or down through it. U.S. Pat. Nos. 2,851,067 and 4,215,612 disclose such tables.

SUMMARY OF THE PRESENT INVENTION

The present invention comprises a portable table unit on which the saw is secured at the motor end and also at the bar end. A foot treadle operates the trigger or switch. The wood to be cut is placed on top of the bar at the bar end. The forward movement of the chain presses the wood against the support to which the bar end is secured, thus holding the wood for quick and easy cutting.

BRIEF DESCRIPTION OF THE DRAWINGS

The invention will now be illustratively shown in the embodiment in the following drawings which are not limiting as to dimensions and materials.

FIG. 3 is an elevation view of the left side of the present invention.

FIG. 6 is a sectional view of one embodiment for attaching the removable legs of the present invention.

FIG. 7 is a sectional view of an alternate embodiment for attaching the removable legs.

FIG. 10 is a perspective view of an extension for the foot pedal of the trigger switch assembly of the invention.

FIG. 11 is a perspective view of an adjustable trigger pad.

DETAILED DESCRIPTION OF THE PRESENT INVENTION

Figure 1:
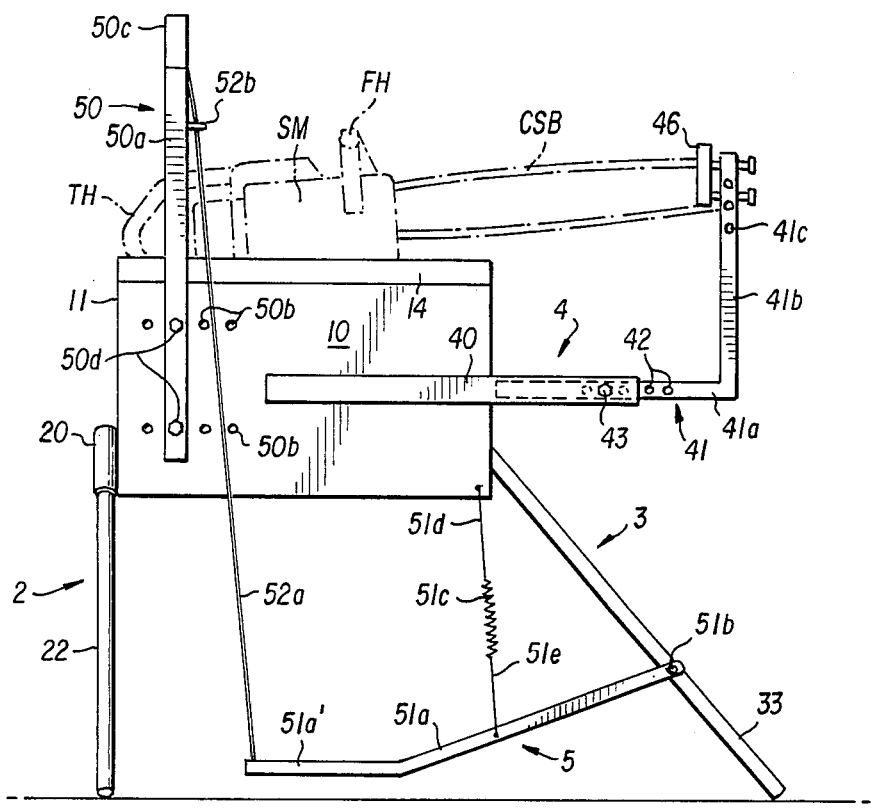
FIG. 1 is a front elevation view of the present invention.

Referring to FIG. 1, the present invention comprises a support table assembly 1, a rear leg assembly 2, a front leg assembly 3, a chain bar support assembly 4 and a trigger switch assembly 5.

Figure 5:
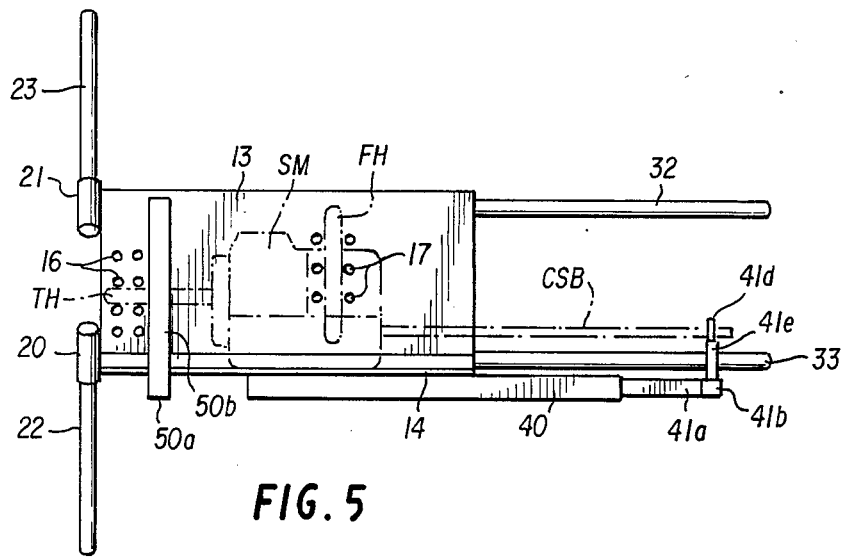
FIG. 5 is a top plan view of the saw support table of the present invention.

The saw support table assembly comprises a box-like structure of metal or wood having a front panel 10, a left panel 11, a rear panel 12 and a top panel 13, the right side and bottom of the structure being open. The top panel 13 carries a plate 14 along the front panel 10. The plate 14 may be the upright arm of an angle iron and hence the lower leg 15 would be welded or bolted to the panel 13. The plate 14 may be a flat member welded or bolted to the upper portion of the panel 10. The purpose of plate 14 is to give lateral stability to the saw motor SM. Referring to FIG. 5, the rear portion of panel 13 carries a plurality of pairs of openings 16 to accommodate the trigger handle TH of various sizes and makes of saws. A U-bolt (not shown) is placed over the lower bar of the handle and appropriate nuts are secured to the bolt on the under side of the panel 13, for which purpose the right side of the box has been left open. The front portion of panel 13 also carries a plurality of pairs of holes 17 to hold the lower bar of the front handle FH of the saw to the table, utilizing one or more U-bolts to insure stability of the motor portion of the saw on the top panel 13.

The rear leg assembly 2, as best seen in FIG. 3, comprises two sockets 20 and 21 secured to left side panel 11 in the lower corners thereof and angled outwardly on that panel, and a pair of legs 22 and 23 which are inserted into the sockets. The legs 22 and 23 are removable for ease of transport of the support table. The divergence of the legs provides excellent lateral stability to the table during operation.

Figure 2:
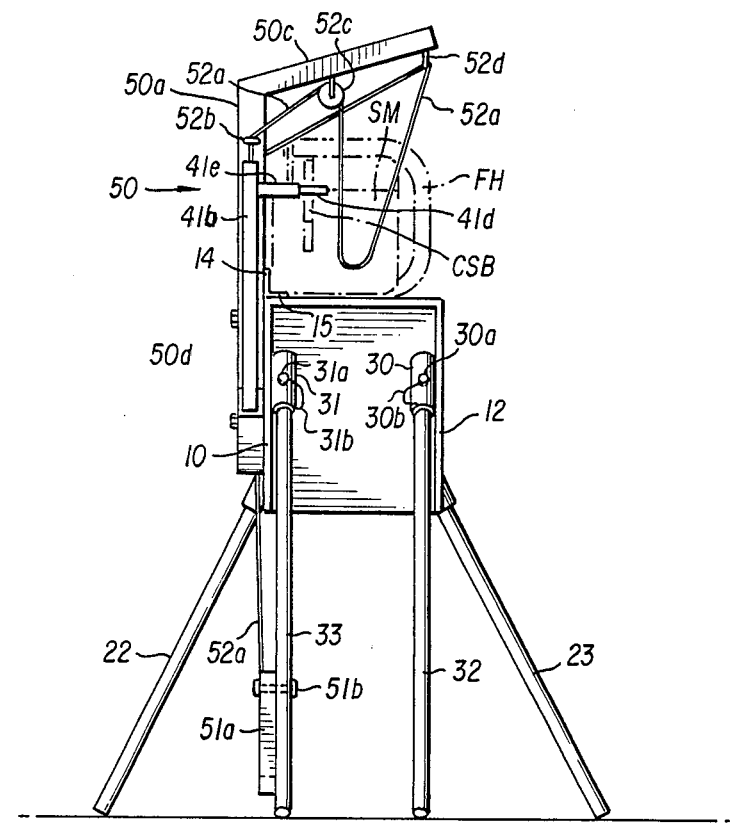
FIG. 2 is an elevation view of the right side of the present invention.
Figure 4:
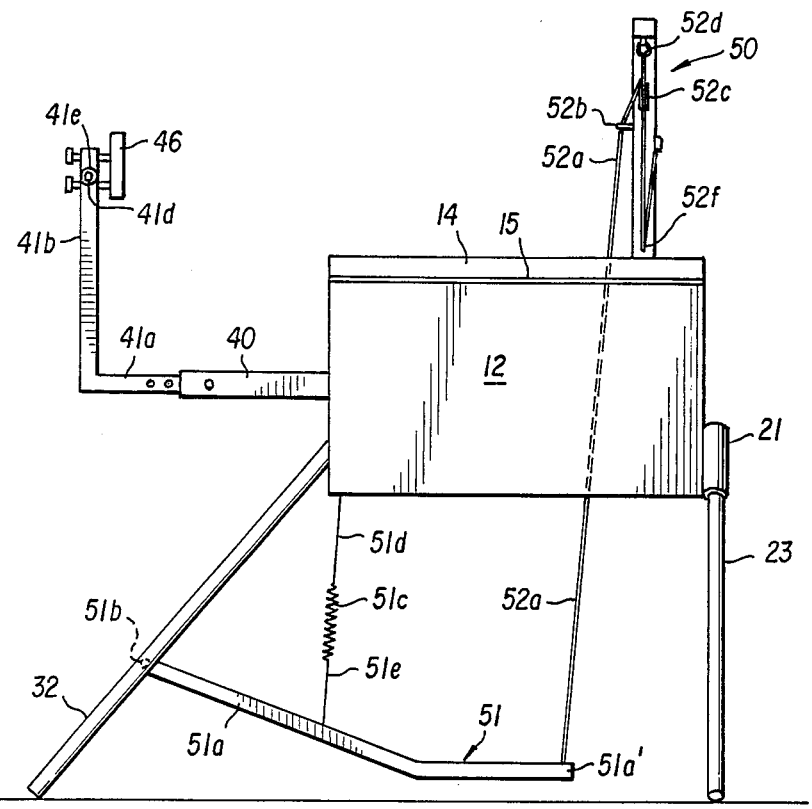
FIG. 4 is a rear elevation view of the present invention.

The front leg assembly, as best seen in FIG. 2, comprise two sockets 30 and 31, secured to the inner surfaces of front panel 11 and rear panel 12, respectively, the sockets being again angled downdwardly and outwardly. Legs 32 and 33 are inserted into respective sockets. As with the rear leg assembly, the legs of the front leg assembly are removable from their respective socket for ease in transporting the chain saw support table.

It is to be understood that in both the rear leg and front leg asssemblies the sockets in their respective legs may be of circular or square cross section. The sockets may be made of metal or plastic and the upper ends of the sockets may be either closed or open. The legs themselves may be made of wood, plastic or metal and may be hollow or solid. Sockets having a closed upper end, illustratively employed for the rear leg assembly, will require means to secure the legs therein as the upper end of the leg will abutt the inner surface of the closed end of the socket (see FIG. 6). If sockets having open ends are employed, illustratively employed for the front leg assembly, it will be necessary to use a pin or bolt (30a and 31a) to hold the legs within the socket as shown in FIG. 7. Use of means to secure the bolt in such employment is optional, but if such is employed, a wing nut is preferable since it may be hand tightened. Socket having interior threads and legs having exterior threads on one end may also be used.

Figure 8:
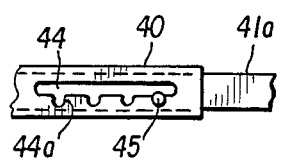
FIG. 8 is an alternate embodiment for securing the chain saw bar adjustable member.

The chain saw bar support assembly 4, as best seen in FIG. 1 and FIG. 5, comprises a horizontal member 40 which is secured to the front panel 10 and an L-shaped member 41 slidable in the outer end of the horizontal member 40. To accommodate the various lengths of chain saw bars, the outer portions of the rigid member 40 and the horizontal member 41a of extensible member 41 are provided with matching spaced openings 42 in which are inserted in a bolt 43 with a nut (not shown) to secure the extensible member 41 in proper relationship with the rigid member 40. Although shown with the openings in the vertical surfaces of the members 40 and 41a, the openings may be in the horizontal surfaces of these members which would eliminate the necessity of having to utilize a wing nut in order to prevent the bolt from falling out during the sawing operations. In an alternative to the use of openings through the members 40 and 41a, it can be seen in FIG. 8 by the use of a slot 44 in the outer portion of the rigid member 40 which has notches 44a therein and a stud 45 is affixed to the surface of 41a which can be selectively positioned in the appropriate notch. The upright arm 41b of the extensible member 41 is provided to engage and hold the nose end of the chain saw bar. Most chain saw bars have an opening in the nose end of the bars. The upper end portion of the upright arm 41b has a plurality of openings 41c therethrough in which a bolt 41d may be selectively inserted to engage the hole in the chain saw bar, and the chain saw bar then secured to the upright arm 41b by means of a wing nut. A sleeve 41c is provided for bolt 41d to laterally position the chain saw bar. The length of the chain saw bar and the angle which the chain saw bar is mounted on the motor portion of the saw generally dictate the selection of the proper opening in upright arm 41b. Most all the selections of the appropriate opening in 41b to engage the opening in the chain saw bar nose portion will determine the position of horizontal element 41a in the rigid member 40. To provide an appropriate arbor against which the wood to be cut may be placed for chain saw bars in which the opening is in the semicircular nose end of the chain saw bar there is provided a removable stop 46. In such instances, the wood to be cut is placed on the generally straight portion of chain saw blade in contact with stop 46. For those of chain saw bars in which the bar opening is not in the nose of the bar, the stop may be removed.

Figure 9:
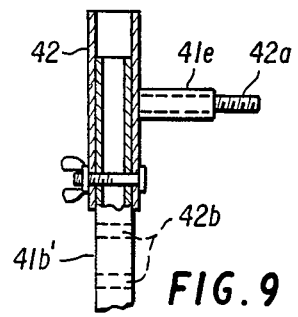
FIG. 9 is a partial cros-sectional view of an alternate embodiment to hold the chain saw bar.

In FIG. 9 there is shown alternate means for attachment of the upright arm 41b to the nose end of the chain saw bar. In this embodiment, there is provided a slidable element 42 for the upper portion of the vertical element 41b' having a fixed, threaded stud 42a on the end to engage the opening in the chain saw bar and be secured thereto. There are a plurality of openings 42b in the slidable portion and the fixed upright element to adjustably position slidable element 42 so that the chain saw bar may be properly positioned and may be secured in the most positive position.

It will be apparent to those skilled in the art of making relatively positioned members that use may be made of slots in both members 41b' and 42 in lieu of the holes in order to provide ease and more accuracy in properly positioning the slidable members.

It should also be noted that wherever bolt are used to secure the movable elements of the present invention such as the legs and the chain bar support elements, the bolts may be secured to the appropriate member of by means of flexible metal strands (see FIG. 2 and FIG. 7).

The trigger assembly 5, as best shown in FIGS. 2 and 3, comprises an inverted L-shaped assembly 50, a treadle assembly 51 and lanyard assembly 52. The upright arm 50a of assembly 50 is bolted to front panel 10 in a vertical manner or at a slight angle to the rear as shown in FIG. 1 or angled forward, depending upon the particular saw which is to be used and the trigger action employed by the saw. Additional holes 50b are provided to reposition assembly 50 to accommodate unusual chain saw motor housings. The base arm 50c is angled upward slightly as shown but may be horizontal. It is provided for holding certain elements of the lanyard assembly 52.

The treadle assembly 51 comprises a foot pedal 51a which is pivotally attached at one end by appropriate means 51b to the lower portion of leg 33. Foot pedal return means having a spring 51c connecting the flexible metal strands 51d and 51e connects the foot pedal 51a and front panel 10 as shown in FIG. 1. The inner end portion 51a' of foot pedal 51a is bent upwardly as shown in FIG. 1 to provide a general horizontal foot rest for the operator. For the comfort of the operator, there may be provided a foot pedal extension 51f bar as shown in FIG. 10.

The lanyard assembly comprises a flexible lanyard 52a of weather resistant material such as a braided rope of nylon or propylene is attached at one end to the inner end of the foot pedal 51a. The lanyard 52a passes upwardly through a guide 52b on the face of support 50a, to a pulley 52c which is pivotable mounted at approximately the mid point of the base arm 50b, then through a guide 50d affixed to the outer end of the base arm 50b and back to a clamping means 50e on the upright arm 50a adequate slack in lanyard 52a is provided between pulley 50c and guide 50d to provide a loop 52f to be placed over the saw trigger. Additional guides (not shown) may be employed on the upper and lower edges of front panel 10 to ensure that there is no abrasion of the lanyard 52a by contact the support table.

To ensure there are proper contact between the trigger of the saw and lanyard alignment 52a which passes thereover there may be provided a tab 52g (FIG. 11) which may be moved along the lanyard 52a and properly placed over the trigger.

OPERATION OF THE INVENTION

It is contemplated that the invention would normally be provided with the saw support table assembly 1, the trigger switch assembly 5 and the chain bar support assembly 4 as a unit with the front and rear legs being separate. When their elements have been placed where the cutting operation is to be done, the legs are assembled with the support table and the foot pedal 51a is connected to the front leg 33. The saw is then placed on top panel 13 and the front handle of the saw secured to the top panel 13 by U-bolts passing through appropriate holes 17 with the saw motor abutting plate 14. If the saw has trigger handle and trigger guard the trigger guard is secured to top panel 13 by means of a U-bolt placed in apppropriate openings 16. the extensible chain saw bar support 41 is movably positioned within the rigid member 40 and secured the opening in the chain saw bar. The lanyard clamp 52e is unloosened so that the leg portion 52f of the lanyard 52a may be positioned over the trigger and the end portion of the lanyard 52a is then pulled up to just be in contact with the chain saw trigger and the clamp 52e then tightened. The engine is then started (for gasoline powered). The foot pedal 51a is depressed which activates the trigger switch causing the chain saw blade to rotate (start the electric motor and saw blade rotation where those versions are used). The wood to be cut is placed in contact with upright chain saw bar support 41b (or a stop 46) and brought down into contact with the forward moving chain saw blade. It its operating position, with a saw support bench will easily handle branches up 3 inches in diameter quickly and with little effort, permitting the accumulation as much as a quarter of cord of this size or smaller in less than an hour with only a single operator. For saws not having an automatic oiling feature, a drip type oiler (not shown) can be mounted on top plate 13 or front panel 10 to lubricate the upper run of the chain saw blade. While the present invention has been described in terms of current design of components, such modifications thereto as may occur to those that are skilled in the art are considered to fall within the scope of the present invention as recited in the following claims.

What is claimed is:

1. A chain saw cutting table comprising a chain saw support table assembly with means to hold a saw motor portion of a chain saw immobile thereon; removable front and rear leg assemblies for said support table assembly; a chain saw bar support assembly positioned on said support table assembly said bar support assembly comprising a hollow horizontal member secured to a front panel of said table assembly and extending beyond the right side of said front panel and an L-shaped member slidably positioned within the outer portion of said horizontal member, the horizontal arm of said L-shaped member and said outer portion of said secured horizontal member each having matching means to secure them together after said L-shaped member has been properly positioned to accommodate the length of the chain saw bar of the saw secured to a top panel of said support table assembly, the vertical arm of said L-shaped member having adjustable means on its upper end to accommodate the angle the saw bar makes with the motor portion and to grip the nose end of said bar; and a cable means to activate said immobile chain saw mounted on said support table assembly and having a pivotal connection to said front leg assembly.

2. The device according to claim 1 wherein said support table assembly comprises a box like structure having a front panel, a left panel, a rear panel and said top panel, the right side and bottom of the structure being open; a plate secured to said top panel along the upper edge of the front panel to laterally stabilize the motor portion of said saw and means operatively associated with said top panel to secure said motor portion to said top panel.

3. The device according to claim 2 wherein said front leg assembly comprises two sockets secured to the inner surfaces of said front panel and said rear panel respectively, said sockets being angled downwardly and outwardly and a leg removably inserted into each socket.

4. The device according to claim 2 wherein said rear leg assembly comprises two sockets secured to the lower corners of said left panel respectively and being angled downwardly and outwardly and a leg removably inserted into each socket and extending downwardly and outwardly to provide lateral stability to said device.

5. The device according to claim 1 wherein said cable means comprises a biased treadle means pivotally attached at one end to a near side front legs and extending under said support table assembly; a flexible lanyard attached at one end to the other end of said treadle means and extending upwardly along and spaced from a front panel through guides mounted on an inverted vertically mounted L-shaped member which is secured to a front panel in adjustable positions, said upwardly extending lanyard terminating in a portion which passes under the cable of said chain saw and in adjustable contact therewith as required by the saw on the table, there being means on said inverted L-shaped member to secure said terminal portion when said lanyard has been properly positioned on said cable.

* * * * *